Oct. 6, 1936.  A. T. LIGHT  2,056,431

REFRIGERATION APPARATUS

Original Filed Dec. 14, 1932  4 Sheets-Sheet 1

Inventor
Albert T. Light
Dodge and Sons Attorneys

Oct. 6, 1936.　　　A. T. LIGHT　　　2,056,431
REFRIGERATION APPARATUS
Original Filed Dec. 14, 1932　　4 Sheets-Sheet 3
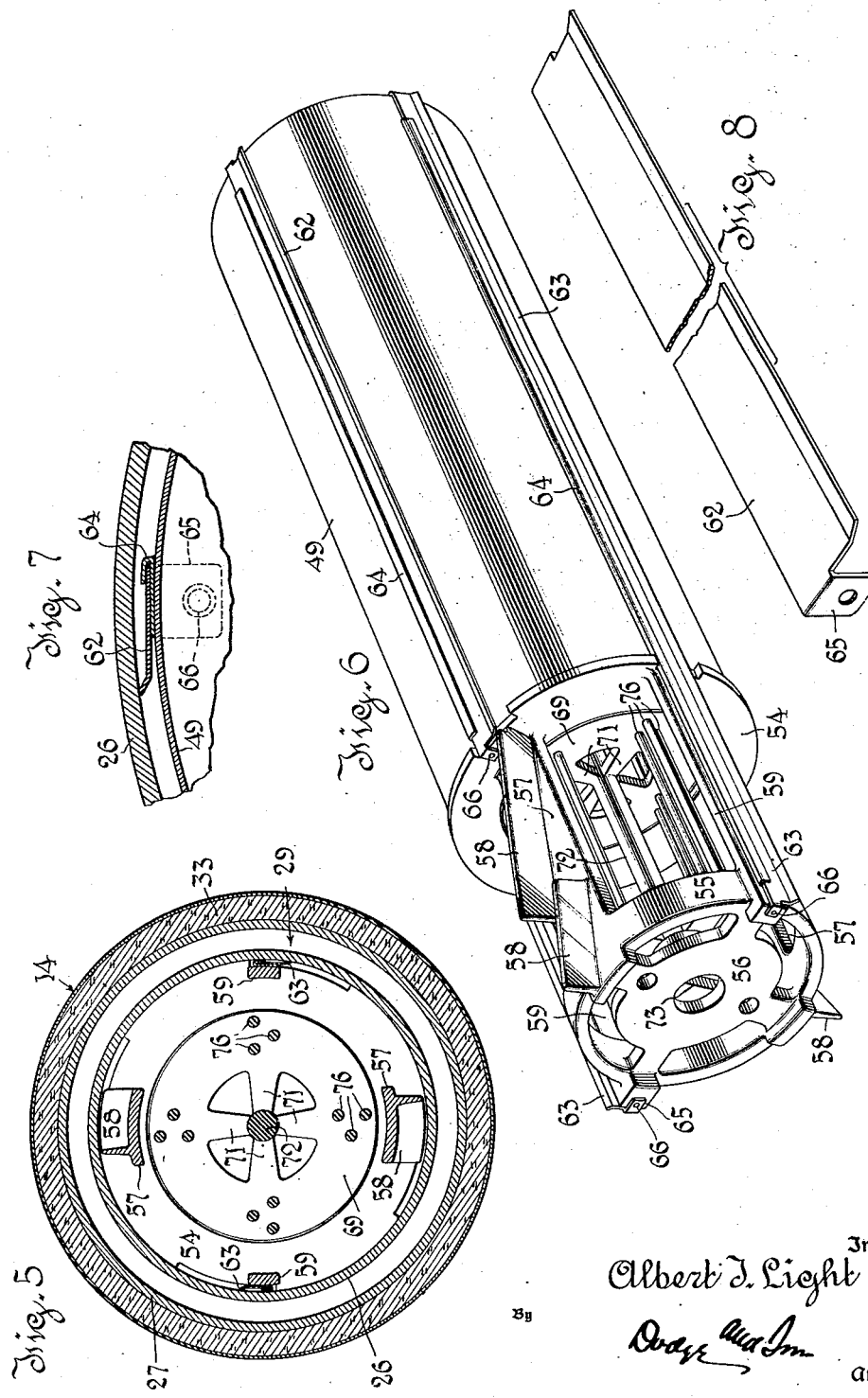
Inventor
Albert T. Light
By
Attorneys Oct. 6, 1936.  A. T. LIGHT  2,056,431
REFRIGERATION APPARATUS
Original Filed Dec. 14, 1932  4 Sheets-Sheet 4
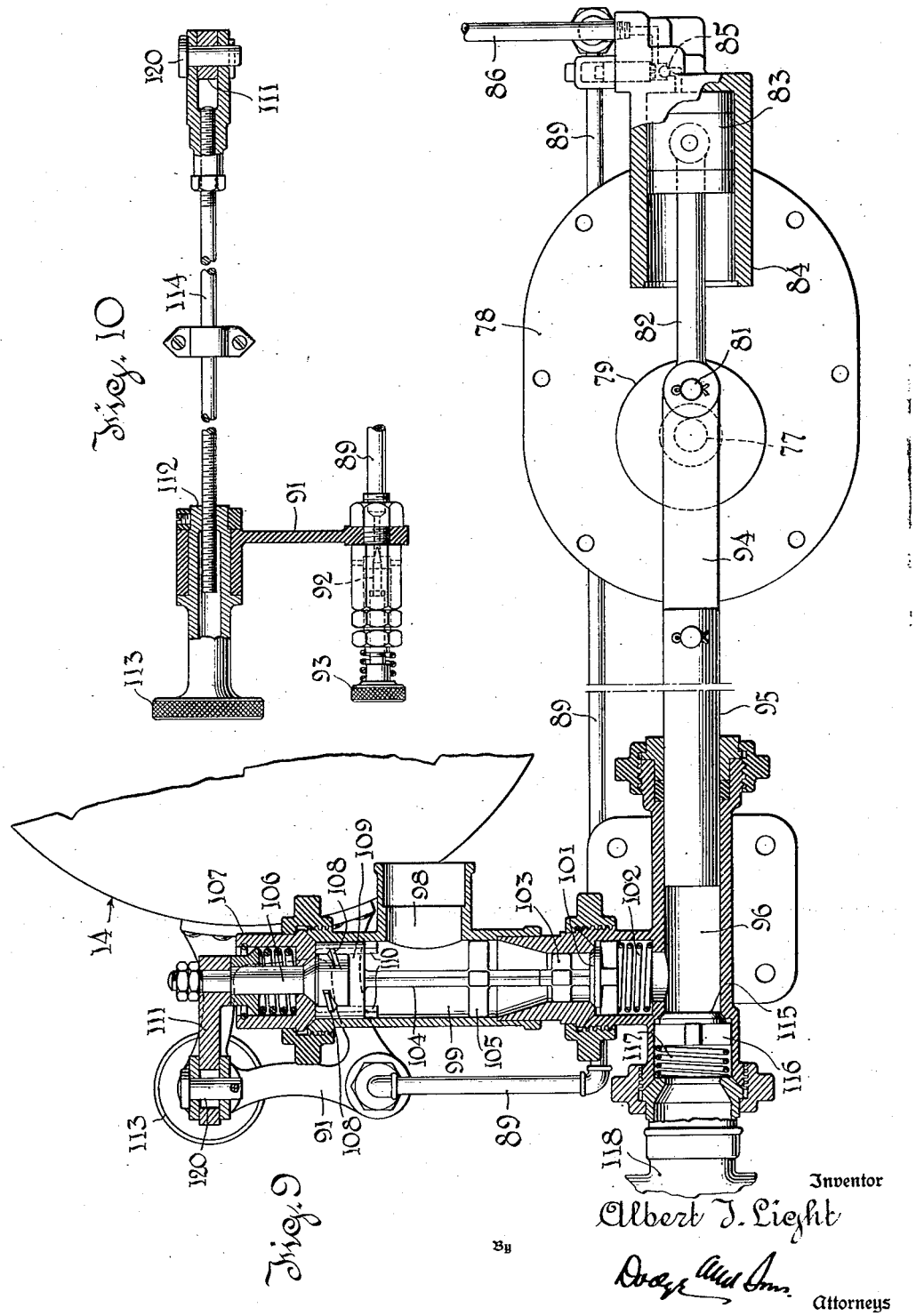
Inventor
Albert T. Light
By
Attorneys Patented Oct. 6, 1936

2,056,431

UNITED STATES PATENT OFFICE 2,056,431

REFRIGERATION APPARATUS

Albert T. Light, Canton, Ohio, assignor to York Ice Machinery Corporation, York, Pa., a corporation of Delaware Application December 14, 1932, Serial No. 647,265
Renewed August 21, 1936

29 Claims. (Cl. 62—114)

This invention relates to the production of ice cream and provides a novel method for manufacturing ice cream and novel apparatus capable of carrying out that method.

In the following discussion the term "mix" will be used as a generic term to define the liquid to be hardened. The machine and process are not limited in their utility strictly to the treatment of cream.

In continuous freezers as heretofore constructed, and particularly in the so-called custard machines, it has been common practice to inject the mix and air under pressure at the same point and actually through the same nozzle. From the time of introduction the mix is whipped or violently agitated to incorporate the air with the mix, the temperature of the mix being gradually reduced throughout this process by means of an envelope or jacket maintained at freezing temperature.

According to one process of this type it has been proposed to whip the partially frozen mix in a separate non-refrigerated chamber as a final step of the process, before discharge into the hardening can.

According to the present invention the mix is injected by a pump or other suitable means, and caused to pass over a refrigerated surface which abstracts the heat from the mix until the temperature falls approximately to what is known as the latent heat point. The latent heat point is the temperature at which the mix commences to change from the liquid to the solid state, and at which heat is abstracted without further reduction of temperature until solidification is complete.

In this first stage of operation the mix is not violently whipped or agitated but is merely scraped from the refrigerated surface to permit the use of low temperatures without the possibility of accumulating a film or coating of frozen mix.

When the temperature of the mix is reduced to or substantially to the latent heat point, a compressed gas, preferably air, is injected into the chilled mix, and at the same time the mix is violently whipped or beaten. During this second stage the abstraction of heat is continued so that during the incorporation of air in the mix the solidification occurs progressively.

By using rotary whippers and drawing the discharge from the center there will be a centrifugal separation so that only aerated frozen mix will discharge from this second stage. By this two stage operation it is practicable to produce ice cream and similar frozen products with any desired degree of overrun and with a texture suitable for discharge into the conventional hardening cans or discharge to any other suitable hardening treatment.

In the present application opportunity is taken to show the further whipping treatment in a separate chamber without abstraction of further heat prior to discharge to the hardening can or other hardening system.

The advantage of proceeding as above described is that when the air is injected with the mix, the mix is not in a favorable condition for the incorporation of air, and much useless beating occurs. Further, the air becomes segregated and the discharge from the machine is uneven, air being vented in large gulps from the discharge. By injecting the air after the mix has reached the latent heat point these difficulties are avoided, for at that temperature the mix whips readily and all the air injected is incorporated, none of it being segregated and discharged.

The first or cooling stage is much more rapid because of the absence of agitation. The second or whipping stage with refrigeration is efficient because the whipping is confined to that period when the mix whips readily. The third stage is not necessary with ordinary mixes, but offers an opportunity for extra whipping where, for any reason, this is desired.

The process might be carried out by specifically different forms of apparatus, but the one here illustrated and claimed is preferred, for the reason that an ordinary ice cream freezer of the cylinder batch type can be converted to continuous operation merely by the insertion of a special whipping structure and closure and by the application of the necessary air and mix pumps with suitable drives for the pumps and suitable discharge connections into the cylinder. This is a point of economic importance because it permits the conversion of existing batch freezers for continuous operation and renders a number of important parts usable interchangeably for either of two types of freezers, for each of which there is a substantial commercial demand.

A preferred embodiment of apparatus will now be described in connection with the accompanying drawings, in which,—

Fig. 5 is a section on the line 5—5 of Fig. 4.

Fig. 6 is a perspective view of the whipper structure withdrawn from the cylinder.

Fig. 7 is a fragmentary section showing one of the scrapers mounted on the whipper structure.

Fig. 8 is a perspective view of a scraper removed from the whipper structure, the middle portion of the scraper being broken away.

Fig. 9 is a fragmentary view, chiefly in section, showing the mix pump with inlet valve control and the air pump.

Fig. 10 is a sectional view showing the control actuating mechanisms for the inlet valve of the mix pump and for the intake of the air pump.

Figure 1:
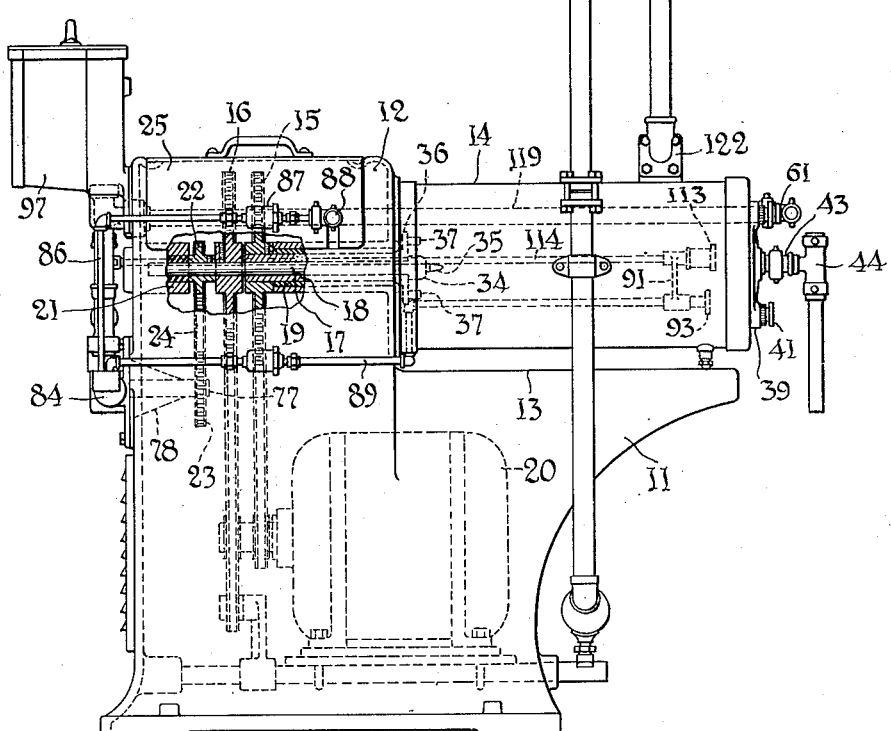
Fig. 1 is a side elevation of the complete continuous freezer with a portion of the casing broken away and a portion of the drive mechanism shown in section.
Figure 2:
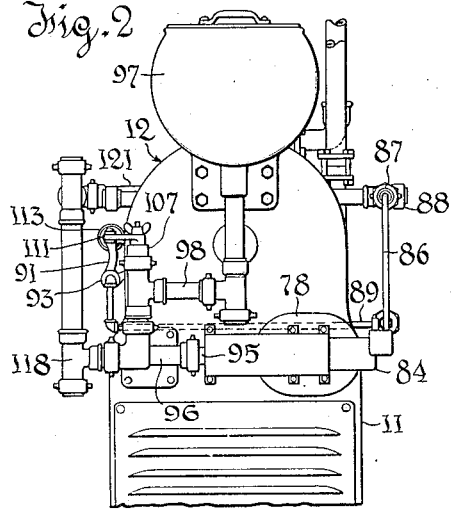
Fig. 2 is a fragmentary elevation of the rear end thereof (left hand end as viewed in Fig. 1).

The freezer is supported on a pedestal or base 11 which is hollow and is provided with a gear case or housing 12 and a shelf portion 13, above which latter the cylinder structure, generally indicated in Fig. 1 by the numeral 14, applied to its envelope, is mounted. The machine is driven by an electric motor 20, shown in dotted lines in Fig. 1 as housed in the lower portion of base 11. This motor drives, through two chains and in opposite directions, two sprocket wheels 15 and 16. The particular drive mechanism is not material to the invention, and is not illustrated in detail. Commercial machines embodying it are in extensive use so that it will be familiar to those skilled in the art.

The sprocket 16 is fast on an inner shaft 17 which turns in a quill shaft 18 upon which the sprocket 15 is fixed. The quill shaft 18 is mounted in bearing sleeve 19, and the rear end of the inner shaft 17 is carried in a bearing 21. Between the bearing 21 and the sprocket 16 is a second sprocket 22 which is fast on shaft 17 and drives a sprocket 23 through a chain 24. The sprocket 23 drives the pump mechanism hereinafter described, and the addition of the sprockets 22 and 23 and the chain 24, represents the entire change necessary in the driving mechanism of a known type of batch freezer. Access to the drive mechanism mounted in the housing 12 is afforded by a removable cover 25 (see Fig. 1).

The inner shaft 17 and the quill shaft 18 are the shafts used in the batch freezer to drive the reversely rotating elements of the scraper and whipper mechanism. In the continuous freezer here described they operate the whipping and scraping mechanism.

The cylinder structure comprises an inner shell 26 which serves as the refrigerated wall of the freezer, an outer wall 27, and annular heads 28 which fill the space between the shells 26 and 27 at their ends, and thus form an enclosed jacket space 29 in which the refrigerant is evaporated or through which it is circulated. While it is practicable to circulate refrigerated brine through the jacket space 29, I prefer to use what is known as direct expansion, a system in which liquid volatile refrigerant, such as anhydrous ammonia, is introduced through a connection 31 and evaporated refrigerant is withdrawn at a definite suction pressure through a connection 32.

The temperature developed in the jacket 29 is regulated by controlling the suction pressure, as is well understood in the art. A convenient arrangement for admitting and discharging the liquid refrigerant, when desired, is that described and claimed in the patent to Zieber 1,866,991, July 12, 1932.

The shell 27 is encircled by thermal insulation, indicated at 33, and enclosed by the envelope 14, already mentioned. The rear end of the cylinder (left end as viewed in Fig. 4) is closed except that the shaft 17 and quill shaft 18 project into it, the shaft 17 terminating in a flat-sided driving head 34 with central pilot pin 35.

Figure 3:
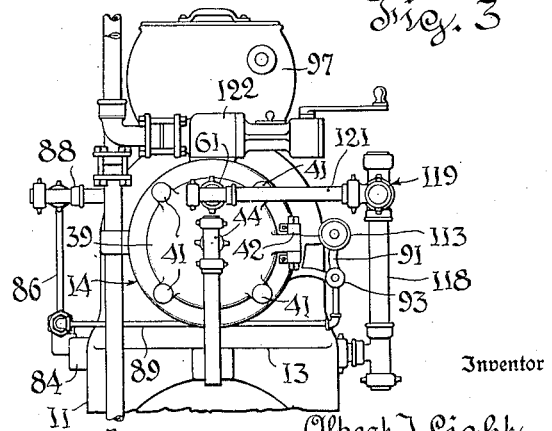
Fig. 3 is a fragmentary elevation showing the front (right hand) end of the freezer shown in Fig. 1.
Figure 4:
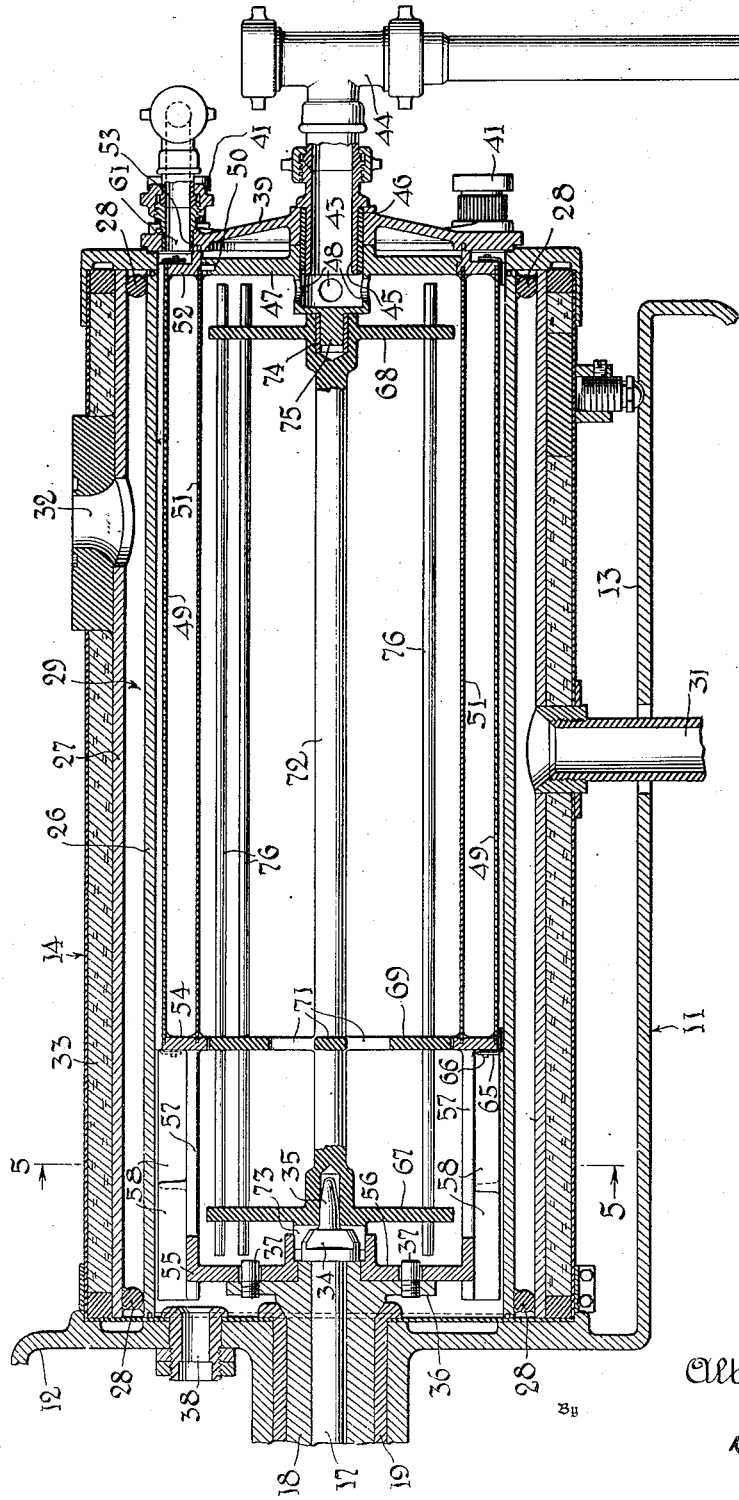
Fig. 4 is a vertical axial section through the cylinder and jackets of the freezer shown in Fig. 1, the parts being drawn on an enlarged scale.

The quill shaft 18 terminates in a hub with driving flange 36, the flange carrying driving pins 37. An air injection nipple 38 is mounted in the rear end head of the cylinder, as best shown in Fig. 4, and is connected, as will hereinafter be more fully described, to the discharge of the air pump. The forward end of the cylinder is closed by a removable closure 39, which is held in place by a plurality of clamping screws 41, four being indicated in the drawings. The head 39 is hinged to the cylinder, as indicated at 42, in Fig. 3, the hinges being formed with slotted lugs so that the head may first be drawn bodily outward to clear the shafts, and then swung to one side. The slotted hinge mounting is common in the art.

The head 39 is provided with an inwardly projecting nipple 45 having a central discharge passage 43. This leads to a discharge connection 44, through which the finished product is discharged into hardening cans or their equivalent. On the inner end of nipple 45 is mounted a bearing bushing 46. Rotatably mounted on the bearing bushing 46 is a disk 47 which is provided with inward projecting hub extension having discharge ports 48 leading to the passage 43. The disk 48 serves to support both the scraper barrel and the whipper structure which is mounted within the scraper barrel.

For about three-fourths of its length adjacent the discharge end of the cylinder, the scraper barrel is made up of two concentric sleeves 49 and 51 spaced apart and connected at their front (right hand) ends by an annulus 52 which encircles and makes a close joint with the disk 47. A pin 50 entering a notch in disk 47 precludes relative rotation. The annulus 52 has a projecting annular tongue 53 which enters and fills a groove in the closure 39 and thus forms a labyrinth seal with that closure. The sleeves 49 and 51 are similarly connected and held in spaced relation at their other end by an annulus 54 which is formed integrally with a yoke or head structure of special form, which will now be described with particular reference to Figs. 4 and 6.

Spaced from the annulus 54, and parallel thereto, is a ring 55 connected by spokes to a central supporting disk 56. The annulus 54 and the ring 55 are connected together by two pairs of longitudinal bars cast integrally therewith, the bars of each pair being diametrically opposed to each other. The first pair of bars 57 are parallel with the axis of rotation and their outer faces are within the periphery of the sleeve 49. They carry diagonal blades or impellers 58, which project nearly into contact with shell 26. The other pair of bars 59 have their outer faces substantially flush with the outer face of sleeve 49. The disk 56 encircles the hub on the quill shaft 18 and seats against its flange 36. It is provided with apertures which receive the drive pins 37. Consequently the barrel structure is supported at its inner end by, and turns with the quill shaft 18. Therefore, it is driven by the sprocket 15.

The mix is received from the discharge of the mix pump, later to be described, and is passed to an inlet nipple 61 which leads the mix through the closure 39 outside the seal 53 and adjacent the annulus 52 so that the mix flows (to the left with reference to Fig. 4) through the space between the sleeve 49 and the inner jacket wall 26.

The barrel structure carries four scrapers. Two of these scrapers, indicated by the numeral 62, are alined with the bars 57 and extend merely throughout the length of the sleeve 49. The other two scrapers 63 extend each throughout the entire length of the sleeve 49 and a bar 59. The structure of these scrapers is not material, but I prefer and illustrate a scraper which is the invention of another, which construction is clearly shown in Figs. 6 to 8 inclusive.

Briefly stated, the scraper comprises a long flexible blade of stainless steel which is seated throughout its length in a retaining notch 64 carried by the outer sleeve 49, or the outer sleeve 49 and also the bar 59, as the case may be. Each scraper has at its opposite ends laterally bent lugs 65 which are apertured and which are snapped over pins 66 provided in the annulus 52, the annulus 54 and the ring 55.

Since the mix is pumped in under pressure, it flows gradually to the left in the space between the sleeve 49 and the jacket wall 26. In its passage throughout the length of sleeve 49, the temperature of the mix is reduced, and the parts are so arranged and operated that in this traverse the temperature of the mix will be reduced at least to the latent heat point. The scrapers 62 and 63 do not violently agitate the mix but they cause it to revolve with the barrel and they remove from the wall 26 any film of frozen mix which may tend to accumulate.

The annulus 54 approximately fills the space within the shell 26, and is notched out as best shown in Fig. 6, for the passage of each of the scrapers 62 and 63, the notches being extended on the leading side of the scrapers so that the mix is delivered through these notches and is then engaged directly by the blades 58. These urge the mix to the left end of the cylinder adjacent the nipple 38 so that when or shortly after the mix has reached the latent heat point air is injected into it. The mix thus cooled and charged with air passes inward around bars 57 and 59 to the whipping mechanism, which will now be described.

This whipping mechanism comprises two cruciform spiders 67 and 68 and a disk 69, whose central portion is cut away to form radial spokes 71. The spiders are mounted on the end portion of the central shaft 72 and the disk 69 is mounted so that it turns within and almost in contact with the annulus 54. The hub portion of the spider 67 has a central hole which coacts with tapered pilot 35 on shaft 17, and has lugs 73 which embrace the flattened faces of the hub 34, thus causing the shaft 72 to rotate with the shaft 17. This structure centers the shaft 72 and holds it in driving engagement with the shaft 17. The design is such as to permit easy assembly.

The forward (right hand) end of the shaft 72 is provided with a bearing bushing 74 which turns on a journal or stud 75 projecting from the hub of disk 47. The whipper structure and the barrel are thus concentric. They turn preferably in reverse directions and at equal angular velocities. The essential thing is differential rotary motion.

The spiders 67 and 68 and the disk 69 carry four groups of whipping rods, three rods being shown in each group, as indicated at 76 (see Fig. 5). The aerated mix, as it accumulates, must move inward past the bars 57 and 59, and is violently whipped by those portions of the bars 76 which lie between the disk 69 and the spider 67. The aeration of the mix reduces its apparent specific gravity so that there is a selective separation tending to send the aerated and partly frozen mix to the center. This mix flows through the center of the disk 69 around the spokes 71 and then passes through the interior of the sleeve 51. In this passage it is violently beaten by those portions of the rod 76 which lie between the spider 68 and the disk 69. It will be observed that in this passage (which is called the third stage) little or no heat is abstracted from the mix because the air space between the sleeves 49 and 51 serves as an insulator. In fact the temperature of the mix may actually rise in the third stage because of the mechanical work performed by the beater.

The finished whipped and partly frozen mix passes through the discharge ports 48, discharge connection 43 and discharge pipe 44, from the freezer.

It is apparent that the rate of flow of the mix through the machine must be regulated in conjunction with the temperature maintained in the jacket 29 if the mix is to leave the first stage at the proper temperature. It is also clear that the amount of air injected must be coordinated with the rate of supply of the mix if the proper degree of aeration, and, consequently, proper degree of overrun, is to be secured. The mechanism hereinafter described permits an absolute control of the degree of overrun. The operating characteristics of the machine are inherently stable, that is, all the air introduced is incorporated in the mix. This occurs because the mix receives the air at that time when it is in condition for whipping. A uniform product is thus secured. The degree of overrun is controlled ordinarily by controlling the relative proportions of air and mix which are delivered to the freezer, the jacket temperature being maintained constant. The air and mix controls are thus important and will now be described.

The sprocket 23 (see Fig. 1) drives a shaft 77 which is mounted in a suitable bearing bracket 78 and projects outward through this bracket to a point external to the base 11 (see Fig. 9). Here it carries a crank disk 79 with crank pin 81. This crank pin drives, through a connecting rod 82, a trunk piston 83 of the air pump or compressor. This compressor is provided with a single acting cylinder 84 and ball check inlet and discharge valves of the automatic type. The discharge valve 85 is indicated in dotted lines in Fig. 9 and the discharge passage leads to a pipe 86 (see Fig. 1) which leads through a strainer 87 to a connection 88 which extends within the housing 12 and connects directly with the injection nipple 38.

The inlet valve of the cylinder 84 is a ball check valve similar to the valve 85, but not shown since the use of ball check inlet valves is a common expedient. Air is supplied to the inlet valve through a pipe 89 which leads to a bracket 91 at the front end of the machine. On this bracket, and controlling the entrance of air into the pipe 89, is a needle valve, shown in dotted lines at 92, and controlled by rotating the knurled head 93. In other words, the volumetric efficiency of the air pump 84, and consequently the quantity of air discharged for each stroke of the pump, is controlled by throttling the inlet to the pump.

A second connecting rod 94 is driven by the crank pin 81 and is connected to the plunger 95 which works in the cylinder 96 of a single acting mix pump. This pump receives the mix from a reservoir 97 supported by the housing 12, the flow being by way of a connection 98 and a vertical inlet passage 99. The passage 99 leads to the seat of the inlet poppet valve 101 of the mix pump. This valve is urged in a closing direction by a coiled compression spring 102 and is provided with a guiding spider 103. A thrust rod 104 having a guiding spider 105 may coact with the pilot 103 to prevent the valve 101 from completely seating.

A shaft 106 is swiveled in a removable head 107 at the upper end of the inlet passage 99 and carries at its lower end a pair of spiral cams 108 which coact with mating grooves in the yoke 109 at the upper end of rod 104. Yoke 109 is held against rotation by the splines 110, so that rotation of shaft 106 in reverse directions moves rod 104 up and down. Shaft 106 carries a crank arm 111 which is adjusted by turning the nut 112. The nut 112 is turned by a knurled head 113, is swiveled in the bracket 91, already described, and is threaded upon a rod 114 pinned at 120 to the lever 111. The shaft 106 is provided with a conical seal to make close joint with the head 107 so that mix will not leak out around the shaft. The head 107 is held in place by a union nut and the parts are so arranged that they can be readily dismounted and when dismounted will expose for cleansing, the passages through which the mix passes and all working parts.

The discharge valve is a simple poppet valve 115, closing that end of the pump cylinder 96 opposite the plunger 95. The valve has guiding wings 116 and is urged in a seating direction by a coiled compression spring 117. Mix discharged past the valve 115 flows through the pipes 118, 119 (see Fig. 1) and 121 (see Fig. 3) to the inlet connection 61 (see Figs. 3 and 4). Adjustment of the knurled knob 113 unseats the inlet valve 103 slightly, and thus permits more or less mix to be discharged back into the reservoir 97 upon the displacement stroke of the plunger 95. In this way the quantity of mix discharged through the valve 115 on each stroke of the plunger 95 is varied.

The valve structure 122, (visible in Figs. 1 and 3) is the ammonia control valve.

The operation has already been described in some detail, and need only be recapitulated.

The rate at which the mix is fed is controlled by adjusting the knob 113 and the rate at which air is supplied is controlled by adjusting the knob 93. The temperature in the jacket 29 is controlled by controlling the suction pressure by any suitable means. Mix alone enters through the fitting 61 and is chilled, without agitation other than scraping as it flows between the sleeve 49 and the refrigerated shell 26. When the mix has finished this traverse it is thrown by the propeller blades 58 toward the jet of air entering through the nipple 38 and a preliminary mixture of air and chilled mix is effected. It will be observed that refrigeration continues while this mixing takes place, after which the mix with partially occluded air flows into the zone of operation of the rods 76 and is violently whipped. During this whipping operation abstraction of heat continues.

The whipped and refrigerated mix then flows past the spokes 71 of the disk 69 and is further whipped while within the sleeve 51, at which point there is no effective abstraction of heat. Finally the product discharges, as already described.

As stated above, the process can be carried out effectively without this third or final stage, and in a subordinate application, I shall describe and claim a specific embodiment of the mechanism adapted for such two stage freezing operation.

The present application is drawn in its broader aspects to method and structure and in its narrower aspects to the particular structure here illustrated. The apparatus is subject to modifications in a number of details without departing from the general inventive principle, and since there is great flexibility in the rate at which the mix is fed through the machine, and since the jacket temperature can be varied by varying the suction pressure, the machine can be operated successfully to produce a somewhat different sequence of events from that described in the opening portion of the present specification. For example, the machine can be successfully operated under conditions which produce some freezing in the first or scraping stage. In fact it requires a very nice balance of the rate of heat abstraction with the rate of flow of mix to insure that the mix will be brought to and not materially beyond the latent heat point at the conclusion of the first stage of treatment, but when so operated it is believed that superior results are secured, particularly with certain classes of mix.

What is claimed is:—

1. The method of freezing ice cream and the like, which comprises cooling the mix to the latent heat point substantially without agitation, and then supplying a charge of gas and agitating the mix while continuing to abstract heat therefrom.

2. The method of freezing ice cream and the like, which comprises cooling the mix to the latent heat point substantially without agitation, then supplying a charge of gas and agitating the mix while continuing to abstract heat therefrom, and finally subjecting the mix to agitation without substantial abstraction of heat therefrom.

3. In a continuous ice cream freezer, the combination of a refrigerated cylinder; a rotary barrel mounted therein, and having a peripheral wall extending opposite a portion of the length of the wall of said cylinder, and forming therewith a thin annular passage; a rotary whipper mounted coaxially with said barrel in position to act upon mix discharging from said annular passage; scraping means carried by said barrel and coacting with said cylinder; means for rotating said whipper; means for feeding mix into said thin annular passage; means for discharging compressed gas into the mix after the mix has passed through at least a part of said annular passage; and means defining a discharge passage leading from a point near the axis of said whipper.

4. In a continuous ice cream freezer, the combination of a refrigerated cylinder; a rotary barrel mounted therein, and having a peripheral wall extending opposite a portion of the length of the wall of said cylinder, and forming therewith a thin annular passage; a rotary whipper mounted coaxially with said barrel in position to act upon mix discharging from said annular passage; scraping means carried by said barrel and coacting with said cylinder throughout its length; means for rotating said barrel; means for rotating said whipper; means for feeding mix into said thin annular passage; means for discharging compressed gas into the mix after the mix has passed through at least a part of said annular passage; and means defining a discharge passage leading from a point near the axis of said whipper.

5. In a continuous ice cream freezer, the combination of a refrigerated cylinder; a rotary barrel mounted therein and having a peripheral wall extending opposite a portion of the length of the wall of said cylinder and forming therewith a thin annular passage; means for feeding mix to said passage; a whipper mounted coaxially with and at least partially within said barrel and extending substantially the entire length of said cylinder, said whipper being adapted to act upon mix discharging from said passage; scraping means carried by said barrel and coacting with said cylinder; means for rotating said barrel; means for rotating said whipper; means for injecting compressed gas into said mix after the mix has passed through at least a portion of said annular passage; and means defining a path to discharge, said path leading through said barrel and through the zone of action of said whipper.

6. In a continuous ice cream freezer, the combination of a refrigerated cylinder; a rotary barrel mounted therein and having through a portion of its length a peripheral heat insulated wall structure which together with the cylinder defines a thin annular passage, said barrel being apertured through the remainder of its length; a rotary whipper mounted within said barrel and extending throughout substantially the entire length thereof; scraping means carried by said barrel and coacting with said cylinder; means for rotating said barrel; means for rotating said whipper; means for feeding mix to said thin annular passage; means for discharging compressed gas into mix leaving said thin annular passage; and means defining a discharge passage leading from the interior of the heat insulated portion of the interior of said barrel.

7. In an ice cream freezer, the combination of a refrigerated cylinder; a cylindrical barrel rotatably mounted in said cylinder and having scraping means coacting with said cylinder; a whipper rotatably mounted within said barrel; means for driving said barrel and whipper to produce relative motion between the two; and means for forcing mix through the space between the cylinder and barrel and thence through the whippers to a point of discharge, said barrel being so formed as to afford communication from said space to said whipper.

8. In an ice cream freezer, the combination of a refrigerated cylinder; a cylindrical barrel rotatably mounted in said cylinder and having scraping means coacting with said cylinder; a whipper rotatably mounted within said barrel; means for driving said barrel and whipper to produce relative motion between the two; means for forcing mix through the space between the cylinder and barrel and thence through the whippers to a point of discharge, said barrel being so formed as to afford communication from said space to said whipper; and means for forcing compressed gas into the mix as it passes from said space to said whipper.

9. In an ice cream freezer, the combination of a refrigerated cylinder; a cylindrical barrel rotatably mounted in said cylinder and having scraping means coacting with said cylinder; a whipper rotatably mounted in said cylinder and extending through a substantial portion of the length thereof; means for rotating said barrel and whipper to produce relative rotation between the two; and means for forcing mix through the space between said barrel and cylinder and then through at least a portion of the interior of the barrel in contact with the whippers to a point of discharge, said barrel being so formed as to afford communication from said space to the interior of the barrel.

10. In an ice cream freezer, the combination of a refrigerated cylinder; a cylindrical barrel rotatably mounted in said cylinder and having scraping means coacting with said cylinder; a whipper rotatably mounted in said cylinder and extending through a substantial portion of the length thereof; means for rotating said barrel and whipper to produce relative rotation between the two; means for forcing mix through the space between said barrel and cylinder and then through at least a portion of the interior of the barrel in contact with the whippers to a point of discharge, said barrel being so formed as to afford communication from said space to the interior of said barrel; and means for forcing compressed gas into the mix substantially as it reaches said whippers.

11. In an ice cream freezer, the combination of a refrigerated cylinder; a cylindrical barrel rotatably mounted in said cylinder and having scraping means coacting with said cylinder; a whipper rotatably mounted in said cylinder and extending through a substantial portion of the length thereof; means for rotating said barrel and whipper to produce relative rotation between the two; means for forcing mix through the space between said barrel and cylinder and then through at least a portion of the interior of the barrel in contact with the whippers to a point of discharge, said barrel being so formed as to afford communication from said space to the interior of the barrel; means for forcing compressed gas into the mix as it issues from said space; and means for impelling the mix so issuing toward the entering gas.

12. Means for converting to continuous operation a batch freezer of the type comprising a refrigerated hollow cylinder, a pair of reversely driven shafts extending concentrically into one end of such cylinder, a removable closure equipped with supply and discharge means for the other end of said cylinder, and a dasher structure driven by said shafts and interposed between the same and said closure, said means comprising in combination a substitute closure having a central discharge passage; a barrel rotatably supported at one end by said closure and at the other end by driving engagement with one of said shafts, said barrel having a portion which defines a thin annular passage between it and said refrigerated cylinder through a portion of the length of the cylinder, and the barrel being further provided with means for scraping the cylinder; a whipper mounted concentrically in driving engagement with the other shaft within the barrel and adapted to act upon mix discharging from the annular passage between the barrel and said cylinder as the mix flows to the central discharge passage in said closure, said barrel and whipper being substituted for the dasher structure of the batch freezer; and two pump mechanisms driven simultaneously with said shafts, one of said pump mechanisms being connected to deliver mix to said annular passage and the other of said pump mechanisms being connected to deliver compressed gas to said mix after it has passed through at least a portion of said annular passage.

13. Means for converting to continuous operation a batch freezer of the type comprising a refrigerated hollow cylinder, a pair of reversely driven shafts extending concentrically into one end of such cylinder, a removable closure equipped with supply and discharge means for the other end of said cylinder, and a dasher structure driven by said shafts and interposed between the same and said closure, said means comprising in combination a substitute closure having a central discharge passage; a barrel rotatably supported at one end by said closure and at the other end by driving engagement wtih one of said shafts, said barrel having a portion which defines a thin annular passage between it and said refrigerated cylinder through a portion of the length of the cylinder, and the barrel being further provided with means for scraping the cylinder; a whipper mounted concentrically in driving engagement with the other shaft within the barrel and adapted to act upon mix discharging from the annular passage between the barrel and said cylinder as the mix flows to the central discharge passage in said closure, said barrel and whipper being substituted for the dasher structure of the batch freezer; a pump driven simultaneously with said shafts, and connected to deliver mix to said annular passage; and means for delivering compressed gas to said mix in its passage through said freezer.

14. In a continuous ice cream freezer, the combination of a refrigerated cylinder; a rotary barrel mounted therein, said barrel having throughout a portion extending from one end a peripheral wall which is opposed to the wall of the cylinder and defines therewith a thin annular passage, said barrel having adjacent its other end a series of propeller blades designed to propel the mix toward the end of the cylinder; a rotary whipper mounted coaxially with said barrel in position to act upon mix discharging from said annular passage; scraping means carried by said barrel and coacting with said cylinder throughout its length; means for rotating said barrel; means for rotating said whipper; means for feeding mix into said thin annular passage; means for discharging compressed gas into that end of the cylinder toward which the mix is thrown by said propellers; and means defining a discharge passage from the cylinder, leading from a point near the axis of said whipper.

15. The combination of claim 8, further characterized in that one of the rotary members mounted within the cylinder is provided with propellers which urge the mix toward one end of the cylinder and the means for forcing compressed gas into the mix is arranged to discharge through that end of the cylinder.

16. In an ice cream freezer, the combination of a refrigerated cylinder having an open end; a barrel rotatably mounted in said cylinder, said barrel being provided with means for scraping said cylinder and having a wall which extends substantially parallel with the wall of said cylinder throughout a portion only of the length of the cylinder to define, between the walls, a narrow flow passage; a removable closure for the open end of the cylinder, said closure being provided with a central discharge passage; means for forcing mix through said narrow passage; and rotary whipping means mounted within said barrel and adapted to act upon mix in its flow from said narrow passage to the discharge passage in said closure.

17. A freezer as defined in claim 16, further characterized in that the mix enters the freezer through a port in said removable closure, flows away from said closure through said narrow flow passage between the barrel and the cylinder, then returns to said discharge passage in the closure through the interior of said barrel, said rotating whipping means extending throughout substantially the entire length of said cylinder and acting upon the mix in its path of flow from said narrow flow passage to said discharge passage.

18. The combination with a continuous ice cream freezer, of two pumps, one for delivering mix and the other for delivering air; adjusting means for varying the delivery rates of said two pumps and connections between said pumps and said freezer, the air pump delivering into the freezer at a point in the path of flow of mix through the freezer a substantial distance beyond the point of entrance of the mix into the freezer.

19. In an ice cream freezer, the combination of two relatively movable surfaces defining a slender flow passage, at least one of said surfaces being maintained at a freezing temperature; means for feeding mix through said slender flow passage; means for freeing frozen mix from such freezing surface; means for supplying gas under pressure to the mix approximately as it issues from said slender passage; and means for whipping said mix and air together and for further abstracting heat therefrom during such whipping.

20. In an ice cream freezer, the combination of two relatively movable surfaces defining a slender flow passage, at least one of said surfaces being maintained at a freezing temperature; means for feeding mix through said slender flow passage; means for preventing the accumulation of frozen mix on such freezing surface; means for supplying gas under pressure to the mix approximately at the time it issues from said passage; means for whipping said mix and air together; means for abstracting heat from the mix while being whipped; and means for further whipping the mix without abstraction of heat.

21. The method of continuously producing ice cream and the like, which consists in rapidly withdrawing heat from a flowing stream of mix and thus reducing its temperature to the latent heat point; as the mix reaches the latent heat point supplying gas under pressure to and agitating the mix to incorporate the gas therewith while continuing the abstraction of heat; and causing the resulting partially frozen mixture to discharge selectively from the zone of concurrent agitation and heat abstraction as the result of the reduction of specific gravity incident to aeration.

22. The process defined in claim 21 in which the agitation is rotary and the selective discharge is effected by centripetal flow.

23. In a continuous freezer, the combination of means forming a slender elongated flow passage and a cylindrical whipping chamber into which said passage discharges near the periphery of the chamber; means for refrigerating the passage and the periphery of the chamber; scraping means operating in said passage and chamber; means for feeding mix through the passage to the chamber; means for injecting air into the mix near the periphery of the chamber; rotary whipping means in said chamber; and means for discharging aerated mix from said chamber.

24. The method of continuously freezing ice cream, which consists in forcing the mix to flow in a continuous path, in the first portion of said path rapidly abstracting heat until the latent heat point is reached, then in the next portion of said path supplying a compressed gas and continuing the abstraction of heat while subjecting the mix to agitation, and then in the next portion of said path subjecting the mix to a further agitation without abstraction of heat.

25. The method of continuously freezing ice cream, which consists in forcing the mix to flow in a continuous path, in the first portion of said path rapidly abstracting heat until the latent heat point is reached, and then in the next portion of said path supplying a compressed gas and continuing the abstraction of heat while subjecting the mix to agitation.

26. In a continuous freezer, the combination of a refrigerated cylinder; a barrel rotatably mounted in said cylinder and defining with the cylinder throughout a portion of the length of the cylinder a slender annular flow passage; means for rotating said barrel; means for scraping said cylinder; means for forcing mix through said slender flow passage; whipping means in said cylinder arranged to act upon mix discharging from said flow passage; driving means for said barrel and whipping means; and means for injecting gas under pressure into said cylinder.

27. In a continuous freezer, the combination of a refrigerated cylinder; a barrel rotatably mounted in said cylinder and defining with the cylinder throughout a portion of the length of the cylinder a slender annular flow passage; means for rotating said barrel; means for scraping said cylinder; means for forcing mix through said slender flow passage; whipping means in said cylinder arranged to act upon mix discharging from said flow passage; driving means for said barrel and whipping means; and means for injecting gas under pressure into said cylinder, the point of injection of gas being such that the compressed gas meets the mix after the latter has been partially refrigerated and before it has been substantially whipped.

28. The method of continuously producing ice cream and the like, which consists in rapidly withdrawing heat from a flowing stream of mix and thus reducing its temperature at least to the latent heat point while subjecting the mix to agitation not substantially more than sufficient to prevent the segregation of solids, and after the mix reaches the latent heat point continuing withdrawal of heat, supplying gas under pressure and violently agitating the mix to incorporate the gas therewith in a finely dispersed state.

29. The combination of a refrigerated cylinder having a closed end and an open end; a movable closure for said open end; at least one shaft projecting into the closed end of said cylinder; a barrel having a releasable driving connection with said shaft and arranged to be supported thereby and by said closure, said barrel defining with the cylinder a slender annular flow-path between the barrel and the cylinder; whipping means associated with said barrel; and means for passing mix through said flow path and then through said whipping means.

ALBERT T. LIGHT.